Nov. 30, 1965 H. S. NICHOLSON 3,220,419

DETACHABLE ASHTRAY

Filed Feb. 25, 1964

INVENTOR.
HARRY S. NICHOLSON
BY
James N. Lyle
ATTORNEY

United States Patent Office 3,220,419
Patented Nov. 30, 1965

3,220,419

DETACHABLE ASHTRAY

Harry S. Nicholson, Pompano Beach, Fla.
(2131 NE. 42nd Court, Lighthouse Point, Fla.)

Filed Feb. 25, 1964, Ser. No. 347,255
1 Claim. (Cl. 131—241)

Figure 1:
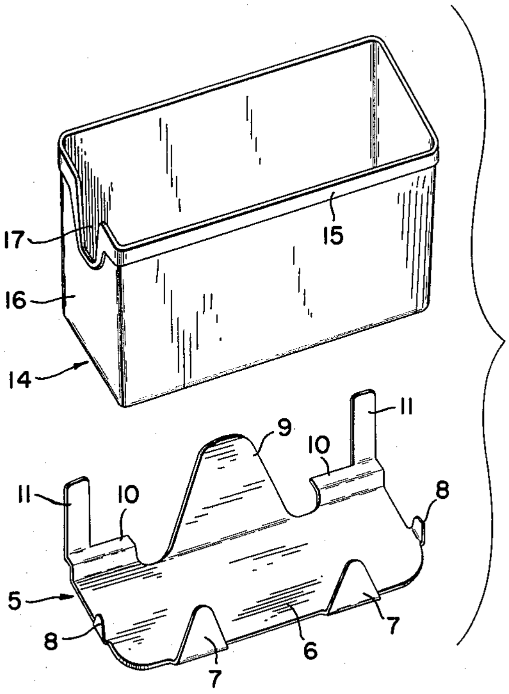

This invention relates to ashtrays and supporting means therefor and whereby the ashtray may have clipping engagement with the side or back of the shell of a telephone instrument.

The invention contemplates a generally rectangular ashtray that may be stamped, extruded or otherwise formed from any desirable material and with the ashtray seating within a platform that has clipping engagement with the telephone instrument.

The invention also contemplates an ashtray for convenient use with a telephone or any similar object to which the supporting platform may be connected and whereby the ashtray is conveniently located adjacent to the telephone instrument as a receptacle for cigarette or cigar ashes during the use of the telephone instrument.

The invention further contemplates a support for the ashtray that includes a flat base plate, forming a platform and with the base plate being provided upon three sides with upwardly bent tongues that receive the lower portion of the ashtray and whereby to prevent shifting of the ashtray and also, a central upstanding tongue that is bent at right angles to the base plate and that engages upon the outer side of the telephone shell and with two offset tongues at the opposite ends of the plate for engagement behind the shell of the telephone for effectively holding the support upon either the side or back wall of the telephone instrument.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 3:
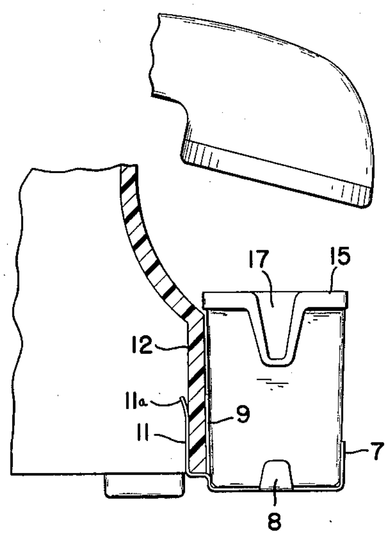
Figure 2:
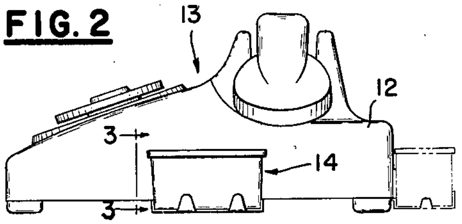

In the drawings:

FIGURE 1 is a composite perspective view of the ashtray and its supporting base, FIGURE 2 is a side elevation of a telephone instrument showing the invention applied thereto, and FIGURE 3 is an enlarged section taken substantially on line 3—3 of FIGURE 2.

Referring specifically to the drawings, there has been provided a supporting base, illustrated as a whole by the numeral 5. The base 5 comprises a flat generally rectangular plate 6, the plate 6 upon its forward edge is provided with a pair of upstanding tongues 7 and at opposite ends is provided with a pair of relatively small upstanding tongues 8. The plate 6 upon its rear edge is bent to form an intermediate relatively large tongue 9 and the plate 6 at its opposite ends is offset as indicated at 10 and with the offset being provided with a pair of upstanding tongues 11. The tongues 11 are offset rearwardly from the tongue 9 to form a socket for the reception of an area of the side wall 12 of a telephone instrument 13. The tongues 11 are slightly curved outwardly as indicated at 11*a*, to facilitate the engagement of the support 5 upwardly from the marginal edge of the shell carried by the telephone instrument 13 and the offsets 10 constitute the limit means for the engagement of the base upon the telephone, as shown particularly in FIG. 3.

Fitted upon the plate 6 and held by the tongues 7, 8 and 9, is a generally rectangular ashtray 14. The ashtray 14 is open at its top and provided with a marginal reinforcing bead 15. One end 16 of the ashtray and the bead 15, is notched at 17 to gripingly hold a cigarette or similar slender smoking article, with the lighted end being disposed within the ashtray 14. The ashtray 14 may be of any desirable construction such as a stamping, an extrusion or any other material that is resistant to fire. The base 5 and the ashtray 14 may be colored and, when the ashtray and the base are formed of aluminum, the elements are annodized in various colors as is well recognized in the art.

In the use of the device, the base 5 is clipped upon either the side wall 12 of the telephone instrument or, as shown in dotted lines in FIGURE 2, it may be clipped to the back wall of the telephone shell. The curvature of the tongues 11 facilitates the engagement of the base 5 over the shell of the telephone where it will be detachably held by the tongues 11 and the tongue 9, the tongue 9 being disposed upon the outer side of the shell while the tongues 11 grippingly engage the inner side of the shell. With the base 5 in position upon the telephone, the ashtray 14 is seated upon the plate 6 and frictionally engaged with the tongues 7, 8 and 9 where it is detachably held against accidental displacement. When the ashtray is to be emptied, it is removed from the base 5 and its contents disposed of and the ashtray 14 then again seated upon the base plate 6, as before stated.

It will be apparent from the foregoing that there has been provided a very novel ash receptacle for convenient use upon a telephone instrument to permit the ashes from a cigarette or cigar to be conveniently supported or dumped into the ashtray and to avoid the very objectionable dropping of the ashes upon the floor or other area adjacent to the telephone. The device is simple in construction, is strong, durable and most effective as a convenience means for receiving the ashes normally accumulating upon a cigarette or cigar during a conversation over the telephone. While the device is preferably formed of aluminum, it can be conveniently formed by stamping or molding and, while the device has been illustrated as attached to a telephone instrument, it will be apparent that any convenient flat support may be employed for clipping the base 5 thereon to dispose ashtray 14 in a position adjacent to the telephone.

It is to be understood that the invention is not limited to the precise construction shown, but that changes are contemplated as readily fall within the spirit of the invention as shall be determined by the scope of the subjoined claim.

I claim:

A detachable ashtray for support upon the shell of a telephone instrument having in combination, a base member and an ashtray that is yieldably supported upon the base, the base being flat and rectangular and with the base having a forward edge, and edges and a rear edge, the front edge being provided with upstanding flexible tongues, the end edges being provided with upstanding relatively smaller yieldable tongues and with the rear edge being provided with a relatively large upstanding tongue, and with the rear edge being provided with a rearwardly offset shoulder having upstanding tongues, the last named tongues being adapted to have a gripping engagement upwardly from a lower marginal edge of the telephone shell and engaging behind a wall thereof, the larger tongue having one face thereof engaging the outer portion of said shell and the other face of said larger tongue engaging the outer surface of a wall of said ash tray, and said base being limited upwardly to a clamped engagement with respect to the shell by the shoulders, the base and its several tongues being integrally formed from sheet metal, a rectangular receptacle open at its top and constituting an ashtray, the ashtray being supported upon the base and grippingly held by the front tongues, the end tongues and the relatively large tongue of the base whereby the ashtray is removably supported upon the base and held against accidental displacement, the ashtray at one end being provided with a tapered notch for the support of a slender smoking article.

References Cited by the Examiner

UNITED STATES PATENTS

| | | | |
|---|---|---|---|
| D. 50,885 | 6/1917 | Freid. | |
| D. 104,161 | 4/1937 | Green. | |
| D. 196,219 | 9/1963 | McKinney | 131—241 X |
| 1,202,816 | 10/1916 | Drake. | |
| 1,404,755 | 1/1922 | Gay. | |
| 1,801,637 | 4/1931 | Nichols. | |
| 2,636,709 | 4/1953 | Haake | 248—229 |

SAMUEL KOREN, *Primary Examiner.*

JOSEPH S. REICH, *Examiner.*